United States Patent
Wang

(10) Patent No.: US 6,373,979 B1
(45) Date of Patent: Apr. 16, 2002

(54) SYSTEM AND METHOD FOR DETERMINING A LEVEL OF SIMILARITY AMONG MORE THAN ONE IMAGE AND A SEGMENTED DATA STRUCTURE FOR ENABLING SUCH DETERMINATION

(75) Inventor: Jia Wang, Plainsboro, NJ (US)

(73) Assignee: LG Electronics, Inc., Seoul (KR)

( * ) Notice: Subject to any disclaimer, the term of this patent is extended or adjusted under 35 U.S.C. 154(b) by 0 days.

(21) Appl. No.: 09/239,972

(22) Filed: Jan. 29, 1999

(51) Int. Cl.[7] .................................................. G06K 9/00
(52) U.S. Cl. ........................ 382/165; 382/220; 345/589
(58) Field of Search ........................ 382/162, 164–165, 382/190, 195, 205, 209, 215–220, 221, 224–225, 305, 170–171, 173, 236, 103, 107; 345/968, 431, 326, 348, 328, 589, 700, 835; 707/104, 3–6, 104.1; 348/699–700, 722

(56) References Cited

U.S. PATENT DOCUMENTS

| | | | |
|---|---|---|---|
| 5,579,471 A | * 11/1996 | Barber et al. | 345/700 |
| 5,751,286 A | * 5/1998 | Barber et al. | 345/835 |
| 5,802,361 A | * 9/1998 | Wang et al. | 382/217 |
| 6,195,458 B1 | * 2/2001 | Warnick et al. | 382/173 |

OTHER PUBLICATIONS

Hsu et al., An integrated Color–Spatial Approach to Content–based Image Retrieval, ACM Multimedia, 0–89791–751–0/95/11, pp. 305–313, Nov. 1995.*

John S. Boreczky et al., Computer Science Division–EECS, 10 Pages.
Shih–Fu Chang et al., Department of Electrical Engineering and Center for Telecommunications Research, 21 Pages.
Ullas Gargi et al., Department of Computer Science and Engineering, 8 Pages.
C. Faloutsos et al., Journal of Intelligent Information Systems, 3, pp. 231–262.

* cited by examiner

*Primary Examiner*—Leo Boudreau
*Assistant Examiner*—Ishrat Sheral
(74) *Attorney, Agent, or Firm*—Birch, Stewart, Kolasch and Birch, LLP

(57) ABSTRACT

A system and method is disclosed for determining a level of similarity among more than one image. Anticipated spatial characteristics of an image are used for automatically identifying segments within the image and for identifying weights to be added to the color characteristics associated with the identified segments. To determine similarity, comparisons are made between weighted color characteristics of corresponding segments of different images. The identified segments have attributes such as size, position and number which are based on the anticipated spatial characteristics of the image. The anticipated spatial characteristics of the image include, among other things, differences in image characteristics that are anticipated at relative positions within the image. Additionally, a standard for representing image data including feature descriptors for color characteristics is disclosed, the color feature descriptor being divided into plural units corresponding to segments within the image identified based on anticipated spatial characteristics therefor.

26 Claims, 8 Drawing Sheets

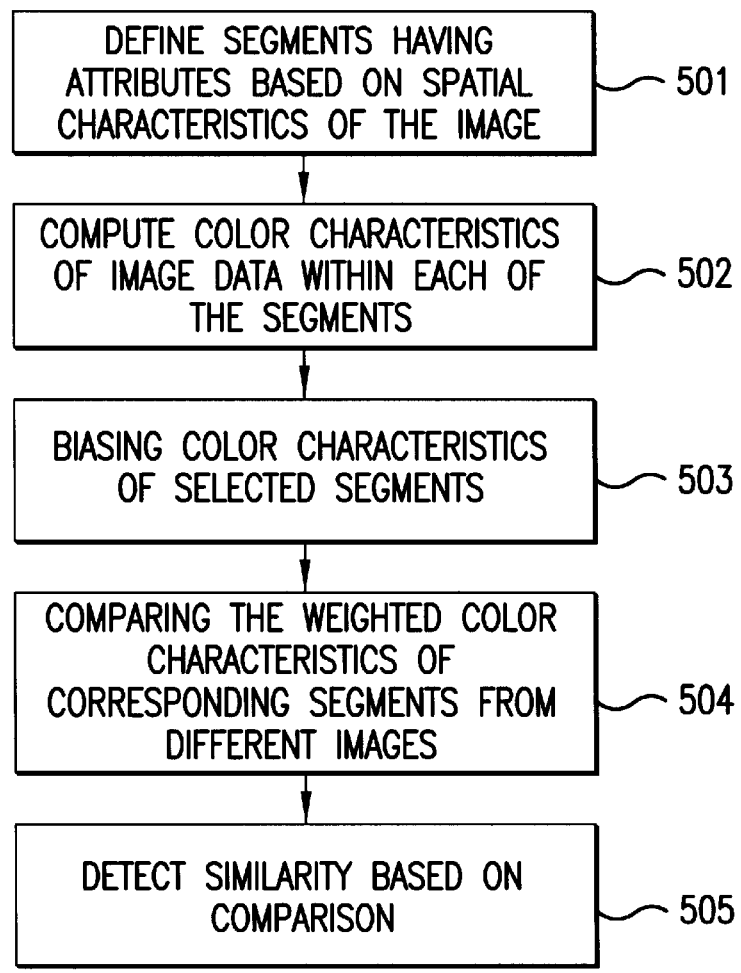
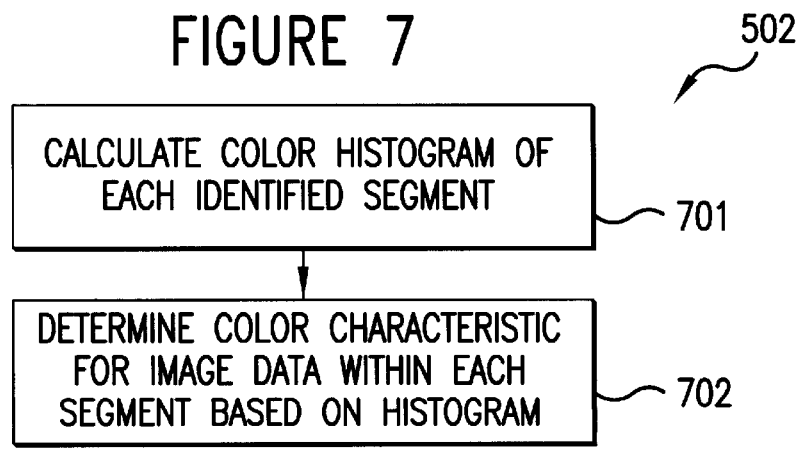

FIGURE 6
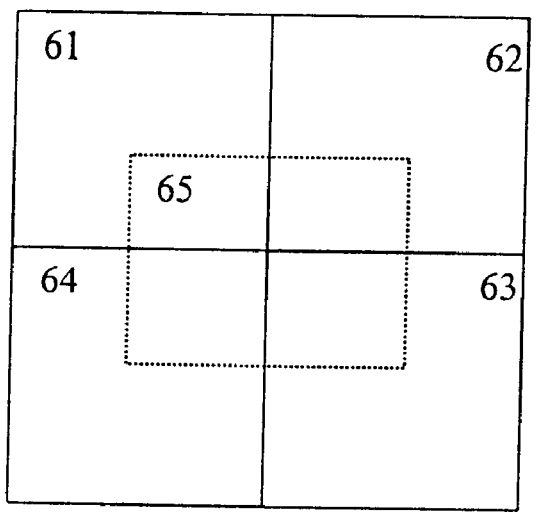
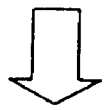
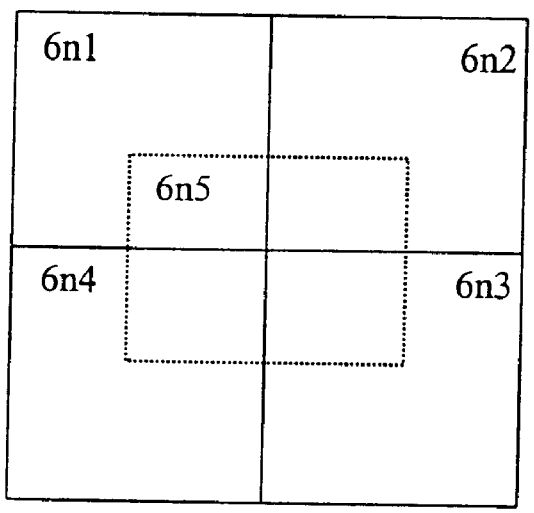

SYSTEM AND METHOD FOR DETERMINING A LEVEL OF SIMILARITY AMONG MORE THAN ONE IMAGE AND A SEGMENTED DATA STRUCTURE FOR ENABLING SUCH DETERMINATION

BACKGROUND OF THE INVENTION

1. Field of the Invention

The present invention relates to a system and method for determining a level of similarity among more than one image and a segmented data structure for enabling such determination. More particularly, the present invention relates to a system and method in which anticipated spatial characteristics of an image are used for automatically identifying segments within the image and for identifying weights to be applied to the color characteristics associated with the identified segments, and to a data structure having a color descriptor field in which plural segments are defined to represent color characteristics of corresponding segments identified in the image.

2. Description of the Related Art

Color is one of the most straightforward and intuitive characteristics to represent an image. For this reason, color histograms have been widely adopted as feature descriptors for images.

To characterize images based on color, conventional systems compute color histograms based on the global color characteristics of an entire image. Specifically, as shown by FIG. 2, conventional systems compute color histograms globally for an image, compute similarity functions to compare color histograms of different images, and detect similarity based on the computed similarity function. Although the histograms computed by these systems provide useful information about the global color content of an image, they fail to provide any spatial information. It is therefore possible for more than one image to have similar color histograms even though those images differ drastically, as demonstrated by FIGS. 1A–1B and 1C–1D.

Other conventional systems segment an image into predetermined areas having standard sizes before computing color histograms. These systems compute color histograms for each of the segmented areas, compute similarity functions to compare color characteristics of corresponding segments within different images, and detect similarity based on the similarity function, as shown in FIG. 3A. However, by segmenting the image into predetermined areas, these systems fail to take advantage of anticipated spatial .characteristics of the image such as the anticipated positioning of objects of interest. Furthermore, these systems generally rely on increasing in the number of segments to increase precision, resulting in increased computational complexity and cross-over noise.

FIGS. 3B and 3C illustrate two conventional systems that identify a predetermined number of standard-sized segments without regard for the anticipated spatial characteristics of an image being processed. The system of FIG. 3B identifies a predetermined number of standard-sized segments (e.g., 64) for any input image, calculates color characteristics within each of the standard-sized segments, and compares the color characteristics of each segment of an image with corresponding segments of other images to determine similarity.

The system of FIG. 3C is somewhat more complex. In the system of FIG. 3, an image is divided into a number of fixed-sized segments, color characteristics of each segment are computed, and the color characteristics of those segments are compared to the color characteristics of other segments within that image. If color characteristics of two or more segments exceed threshold similarity, those segments are merged. Otherwise, the segments are further segmented, each into a second predetermined number of standard-sized subsegments, as shown. Color characteristics are then computed for each subsegment within the non-merged segments, and those color characteristics are compared to the color characteristics of each merged segment and subsegment. If the color characteristics of any subsegment and the color characteristics of any other subsegment or merged segment exceed the threshold similarity, they are merged to form a new merged segment. Otherwise, they are further segmented and compared in an iterative fashion.

As described, the systems of FIGS. 3B and 3C fail to identify segments based on anticipated spatial characteristics of an image. In fact, rather than account for the anticipated spatial characteristics of an image, these systems simply divide the image space into a predetermined number or pattern of standard-sized segments.

FIGS. 4A and 4B describe yet another conventional system for comparing images based on color. FIG. 4A is a flow chart describing this system. In FIG. 4A, objects are identified in step 401, segments are identified in step 402 based on the identified objects, color characteristics are computed in step 403 and similarity is detected in step 404. Unlike the conventional systems described with respect to FIGS. 2 and 3A–3C, the system of FIGS. 4A–4B is not limited to segments of fixed size, position or number. However, the system of FIGS. 4A–4B is also problematic. For instance, the conventional system of FIGS. 4A–4B is not easily implemented due to difficulties with automatic object detection techniques. Thus, manual or semi-manual segmentation is generally required by the conventional system of FIGS. 4A–4B. Furthermore, like the other conventional systems of FIGS. 2–3C, the system of FIGS. 4A–4B also fails to take advantage of anticipated spatial characteristics when identifying segments within the image space, instead relying on detection of spatial features in each particular image being characterized.

SUMMARY OF THE INVENTION

An object of this invention is to describe the color characteristics of images based on anticipated spatial information within those images.

Another object of this invention is to recursively decompose an image into fixed or varied size segments based on anticipated spatial information. Therefore, the color histograms are computed and compared with color histograms of corresponding segments of other images, preferably via a weighted similarity matrix, to determine similarity.

To accomplish this and other objects, the present invention includes a method for determining similarity among more than one image by automatically identifying segments within an image which have attributes based on spatial characteristics of the image, and comparing color characteristics of the image data within the identified segments of the image to color characteristics of the image data within corresponding segments of at least one other image to determine similarity among the images. At least one of the identified segments may overlap other of the identified segments.

Biasing may be performed to achieve greater emphasis for comparisons of color characteristics between selected segments within the images. Weights used to achieve biasing are determined based on the anticipated spatial characteristics. A similarly among the images is determined based on the results of the comparison reflecting the bias.

The anticipated spatial characteristics of the image include differences in image characteristics that are anticipated at relative positions with the image. The anticipated spatial characteristics of the image may also include at least one of an anticipated position of an object within the image and an anticipated difference in coloration between two positions of the image. The attributes of the identified segments include at least one of number, position and size of segments. The size of segments is non-uniform so as to apply unequal emphasis on features within the image being characterized.

The automatic identification of segments may be performed by recursively identifying segments within the image. The number of iterations of the recursive identification of segments is generally determined based on a variance detected among color characteristics of image data within segments previously identified.

The color characteristics are compared to determine an occurrence of change in image characteristics or to identify similar images.

In addition, the present invention includes a data structure that includes fields specifying color descriptors for segments within an image, and standards adopting such a data structure.

Further scope of applicability of the present invention will become apparent from the detailed description given hereinafter. However, it should be understood that the detailed description and specific examples, wile indicating preferred embodiments of the invention, are given by way of example only, since various changes and modifications within the spirit and scope of the invention will become apparent to those skilled in the art from this detailed description.

BRIEF DESCRIPTION OF THE DRAWINGS

The present invention will become more fully understood from the detailed description given hereinbelow and the accompanying drawings, which are given by way of illustration only and thus should not be construed as limiting the present invention to the particular embodiments shown, wherein:

FIG. 5 is a flow chart illustrating a process performed by the present invention to determine a level of similarity among more than one image;

FIG. 6 describes an example of the segmentation process performed in Step 501 of FIG. 5;

FIG. 7 illustrates a method used to construct color descriptors of an image according to Step 502 of FIG. 5;

DESCRIPTION OF THE PREFERRED EMBODIMENTS

Figure 1A:
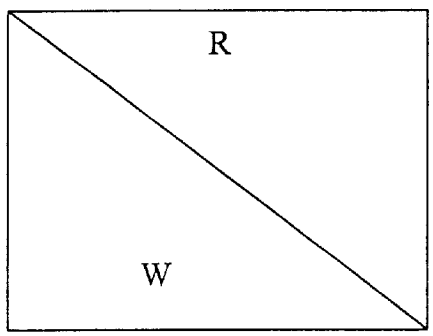
FIGS. 1A–1B and 1C–1D illustrate typical examples of pairs of images that are not readily resolvable by conventional systems and methods for determining a level of similarity among more than one image.
Figure 1B:
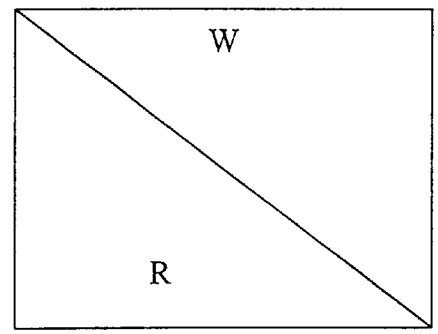
Figure 1C:
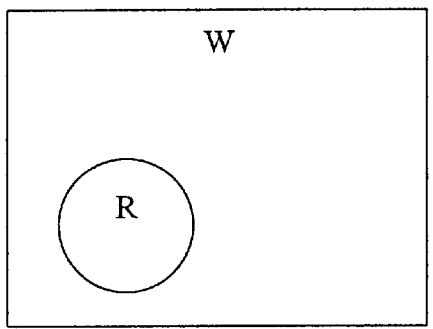
Figure 1D:
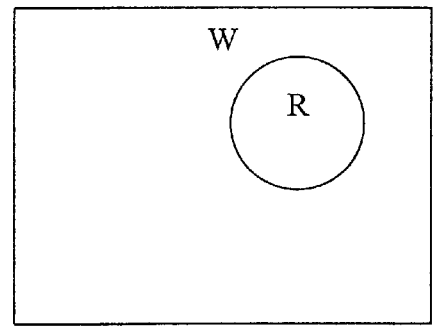
Figure 2:
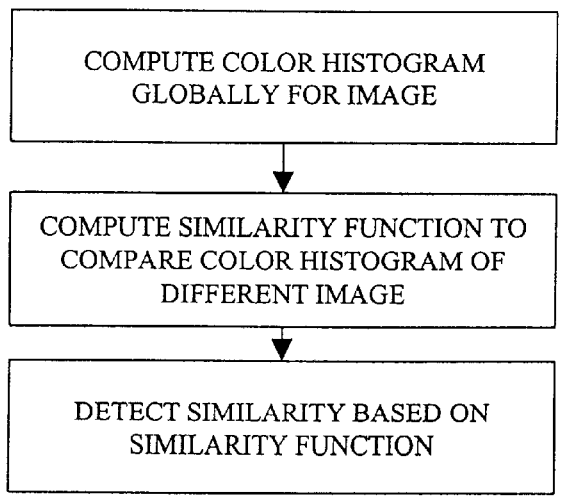
FIG. 2 is a flow chart illustrating a conventional method for determining similarity among more, than one image.
Figure 3A:
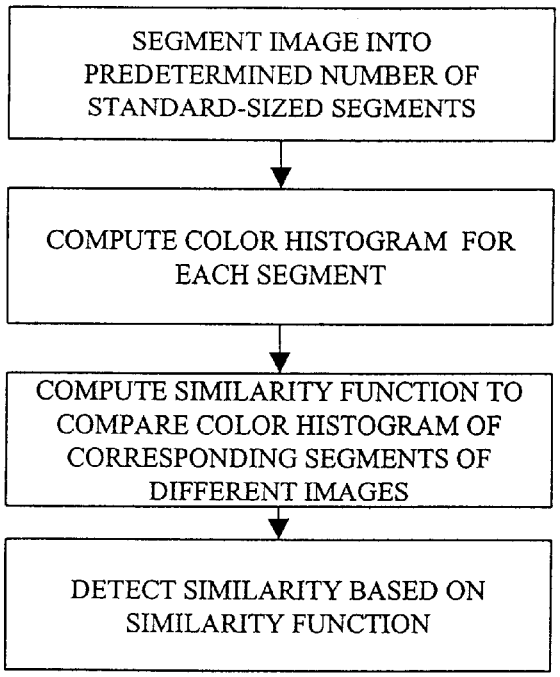
FIG. 3A is a flow chart illustrating another conventional method for determining similarity among more than one image.
Figure 3B:
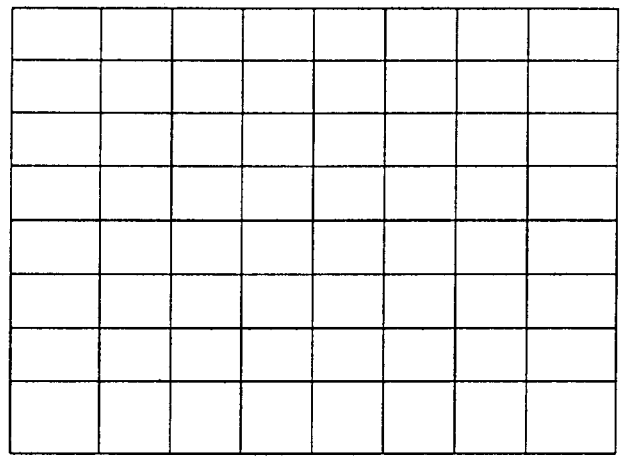
FIGS. 3B and 3C illustrate two different conventional methods for segmenting an image into a predetermined pattern in accordance with the method of FIG. 3A.
Figure 3C:
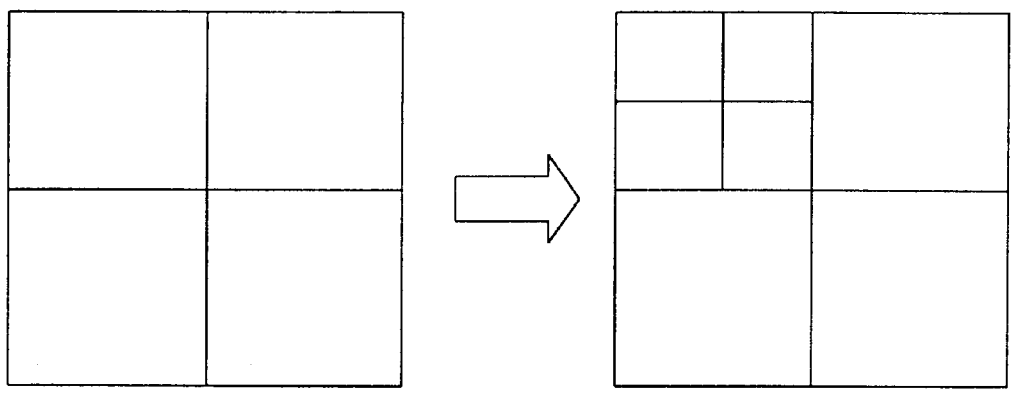
Figure 4A:
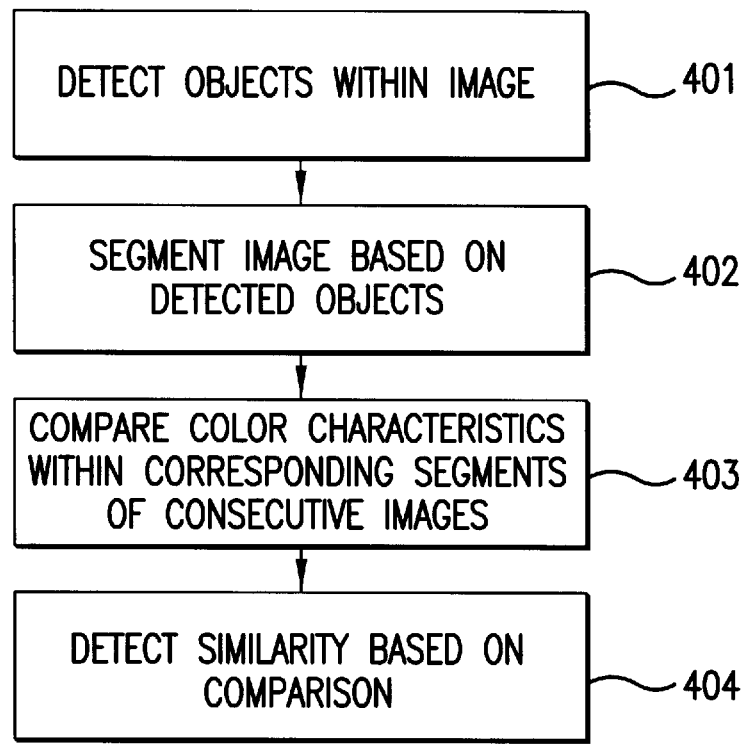
FIG. 4A is a flow chart illustrating a third method for determining a level of similarity among more than one image.
Figure 4B:
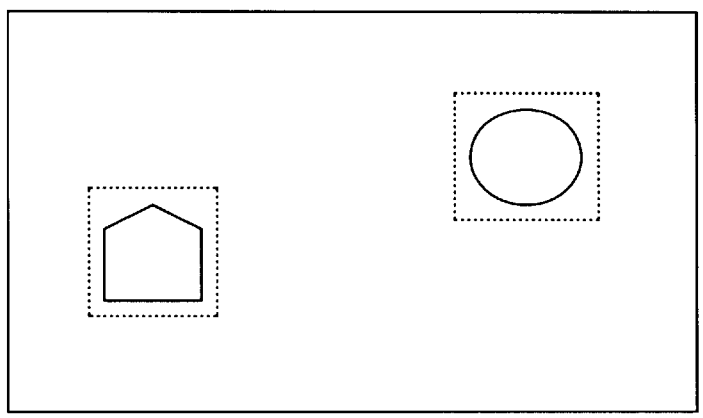
FIG. 4B illustrates a conventional system applying the method described in FIG. 4A.

Reference will now be made in detail to the preferred embodiments of the present invention, examples of which are illustrated in the accompanying drawings.

FIG. 5 is a flow chart describing a process performed by the present invention to compare the color characteristics of more than one image by determining a level of similarity therebetween.

In step 501, fixed or varied sized segments are identified having attributes that are based on spatial characteristics of the image. The attributes of the segments include number, size and position of the segments, each being determined based on anticipated spatial characteristics of the image. The anticipated spatial characteristics of the image may be related to domain characteristics and may vary based on the selection of an object to be emphasized and the location of that object within the domain. Ordinarily, features of interest, are located in the central region of a image. Therefore, anticipating the spatial characteristics of the image based .on the expected location of features of interest therein, a central segment is identified in the preferred embodiment to emphasize color characteristics in the central region image as shown and described in greater detail below with respect to FIG. 6.

In step 502, color characteristics or descriptors (e.g., histograms) are computed with respect to the image data within each of the identified segments. When applying the preferred embodiment to video shot detection applications in which a high degree of correlation exists among consecutive images, the color characteristics or weighted color characteristics of a particular segment may be compared to a mean or weighted mean of color characteristics or weighted color characteristics of corresponding segments within plural preceding images. This process is described in greater detail below with respect to FIG. 7. By contrast, when the preferred embodiment is applied to image retrieval systems involving comparison of the color characteristics of a single still frame to the archived color characteristics of segments within different still images, computation and comparison of a mean is not appropriate. Rather, the color characteristics or weighted color characteristics of segments within the query image and archived images are directly compared.

In step 503, the color characteristics or descriptors computed for each segment may be biased to emphasize particular regions within the image. One of ordinary skill would readily appreciate the variety of well-known methods for applying weights to coefficients or descriptors, such as those used to represent the color characteristics or descriptors computed in step 502. For instance, the coefficients or histograms representing the color characteristics or descriptors may be multiplied by weights defined in a weighting matrix, which weights are determined based on the relative emphasis desired for each respective segment.

In step 504, the color characteristics or descriptors of corresponding segments in consecutive images are compared. If weights are applied to the color characteristics or descriptors in step 503, comparison is made between the weighted color characteristics or descriptors in step 504. Alternatively, steps 503 and 504 may be combined such that a weighted comparison is performed to compare the color characteristics or descriptors for identified segments within consecutive images. For instance, in the preferred embodiment, a weighted similarity function is performed to compare the color characteristics or descriptors of image data within corresponding segments of at least two consecutive images, as described in more detail below with respect to FIGS. 8A and 8B.

In step 505, a level or degree of similarity is determined between consecutive images based on: the comparison performed among corresponding segments of those images in step 504. For instance, in the preferred embodiment, the results achieved by applying the similarity function are compared to a threshold similarity. If the threshold similarity is exceeded, the compared images are deemed to be matching or to be from among a consistent, scene. Alternatively, if the threshold similarity is not exceeded, the compared images are deemed to be different or to be from different scenes, thus representing a scene change. As described, the similarity threshold represents a degree of similarity required to detect matching images or a set of images within a consistent scene. This threshold may be set as high or low as deemed appropriate by the operator, depending upon the similarity sought to be detected in the application being performed.

FIG. 6 describes an example of the segmentation process performed in step 501 of FIG. 5. FIG. 6 shows five segments identified 61–65 within the image, segments 61–64 representing equal sized quadrants of the image and segment 65 representing an overlapping segment used to emphasize color features in a central portion of the image. As shown in FIG. 6, each of the identified segments may be further segmented. For instance, by recursively applying the segmentation process described above with respect to FIG. 6, some or all of the identified segments 61–65 may be further segmented to reveal more detail. To illustrate this process, an example of an algorithm known as the segmentImage routine is provided hereinafter for recursively identifying segments within an image:

```
#define MAX_SEGMENTS 5; // one level of Quin-tree segmentation
segmentImage(int iniRow, int iniCol, int Rows,
    int Cols, int image[ ]) {
        int i,j,startRow; numOfSegments = 0;
        if( (numOfSegments <= MAX_SEGMENTS)
            && (numOfSegments>
0)) {
        calculateColorFeatures(iniRow, iniCol, Rows, Cols, image[ ]);
    } else {
        if(numOfSegments ! = 0) return;
    }
    for(i = 0;i<2;i++){
        startRow = iniRow + i*(Rows/2);
        for(j = 0);j<2;j++) {
            segmentImage (startRow, iniCol +
                j *(Cols/2), Rows/2, Cols/2);
        }
    }
    segmentImage(iniRow + Rows/4, iniCol + Cols/4, Rows/2, Cols/2);
}// end of segmentImage ( )
```

Note that reference variables i and j can be changed to increase or decrease the number of regions identified each iteration. Also, denominators in the argument for the routine can be changed to modify the position or size of segments within some or all regions.

In FIG. 6 and the above-described exemplary routine, a fifth overlapping segment 65 is added to an otherwise symmetric and uniformly segmented image space, that fifth segment 65 overlapping other segments 61–64 within the image space. However, the segmentation process described with respect to step 501 should not be narrowly construed to limit the invention to a single non-uniform or overlapping segment. Rather, any or all of the segments may have uniform or non-uniform size and shape, and any or all of the segments may or may not be partially or completely overlapping. Additionally, the recursive segmentation process may or may not reiterate the segmentation originally applied to the image space. Rather, those of ordinary skill would readily appreciate that the segmenting process described above may be modified in various ways based on anticipated spatial features of images, thereby emphasizing or de-emphasizing color characteristics within regions of interest within the image.

FIG. 7 is a flow chart describing an example of the process performed in step 502 to compute color characteristics or descriptors for image data within each of the image segments identified in step 501. In step 701 of this example, a color histogram is calculated for each identified segment within the image. In step 702, a color descriptor is extracted based on the histogram calculated in step 701. That is, in step 702, the results of the histogram are quantized to enable comparison with histogram results from corresponding segments of other images. Although the example of FIG. 7 involves quantization based on histogramming techniques, one of ordinary skill in the art would readily appreciate that other processes may also be used to compute color characteristics or descriptors capable of comparing corresponding segments of multiple images.

Figure 8A:
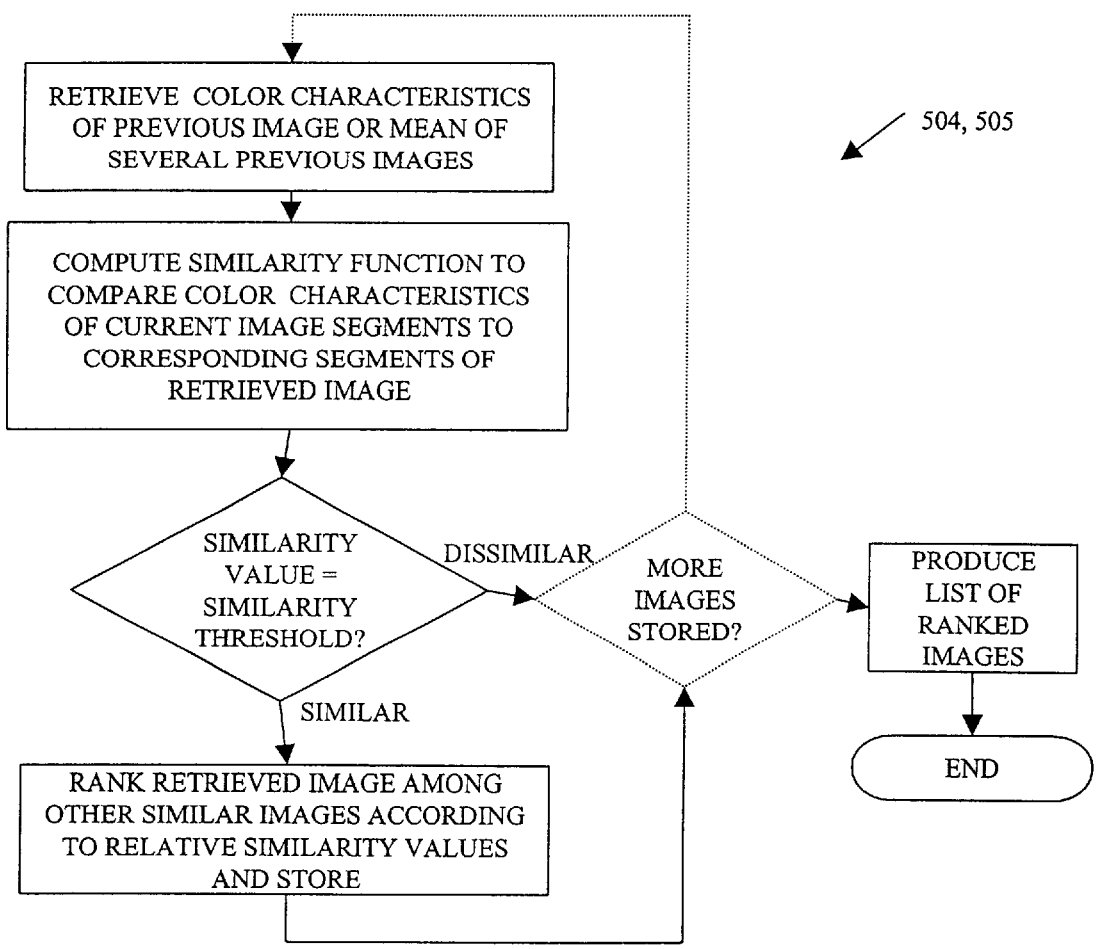
FIG. 8A is a flowchart illustrating a method for determining similarity based on color descriptors of an image according to Steps 504 and 505 of FIG. 5.
Figure 8B:
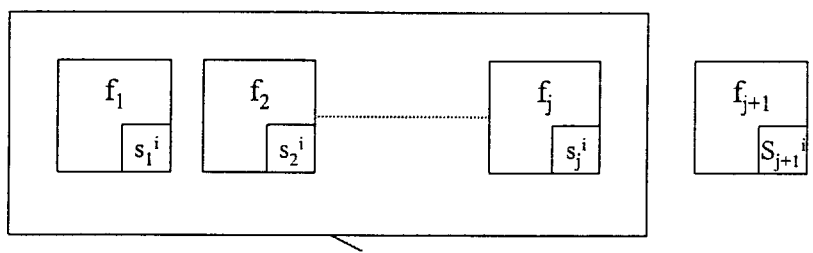
FIG. 8B shows how a group of several images may be represented as a single image for purposes of comparison of the collective color characteristics of segments therein to those of other images.

FIG. 8A is a flow chart describing an example of a process performed in steps 504 and 505 of FIG. 5 to compare color characteristics of corresponding segments within different images and to determine a similarity based on that comparison. In this process, the color characteristics of a previous image or the mean of color characteristics of several previous images are retrieved. For instance, as shown in FIG. 8B, a group of images $f_1$–$f_j$ may be deemed or somehow identified as representing a single scene or image 81 in which case the color characteristics of the image 81 may be represented by a mean of the color characteristics of its constituent images $f_i$–$f_j$. In step 802, a similarity function is performed to compare the retrieved image data to the color characteristics of a current image (step 802). The results of the similarity function are then compared to a threshold similarity in step 803 to characterize the current image as similar or dissimilar to the retrieved image data. If the similarity value exceeds the predetermined similarity threshold value, the current image is considered to be similar or to represent the same shot; otherwise, the current image is considered dissimilar or a new shot boundary is detected.

In applications involving retrieval of stored images based on their similarity, the process of steps 801–803 may be repeated, as necessary, to compare the color characteristics of a query image to those of several stored images. For example, the portion of the flowchart of FIG. 8A shown with hashed lines illustrates a process for repetitively performing steps 801–803 to compare the color characteristics of a query image to the color characteristics of previously obtained images, e.g., images stored within a database. Specifically, in step 804, when the similarity threshold is exceeded as a result of a comparison performed in step 803, the image being compared is ranked according to its similarity value among other images previously deemed similar. Then, regardless of whether the similarity value exceeded the similarity threshold in step 803, step 805 is performed to determine whether more images are available for comparison (e.g., stored in the database). If more images are available, steps 801–803 are repeated. However, if more images are not available, the ranked list is produced and the process of FIG. 8A is concluded.

The comparison performed in step 604 includes a similarity function. In general, the similarity function required by step 504 for comparing coefficients representing image characteristics may be selected from various similarity functions that are well-known to those of ordinary skill. However, conventional similarity functions used to perform the comparison of step 504 may be modified to also perform the biasing required by step 503. As shown in the following exemplary algorithm, a conventional similarity function is adapted to perform a weighted comparison of the color characteristics of corresponding segments of more than one image. Specifically, the following weighted-similarity function can be used to compare a histogram for a current image frame ($f_{j+1}$) to a previous image frame ($f_j$):

Similarity $$(H(f_{j+1}), H(f_j)) = \frac{1}{m \times n} \sum_{i=1}^{k} W_i I^i_{j,j+1},$$

where $H(f_{j+1})$ and $H(f_j)$ are histograms or other color characterization representations for the current and previous images, m and n define the image size, k represents a maximum number of segments within one image, $W_i$ is the weight of the ith segment, and $I_{(j,j+i)}$ defines a color histogram intersection function for the ith segment in accordance with the following:

$$I_{(j,j+1)^i} = HistogramIntersection(h(s^i_j)), h(s^i_{j+1}))$$

$$= \sum_{B=1}^{\alpha} \min[h^\beta(s^i_j), h^\beta(s^i_{j+1})],$$

where α represents the dimension of the color histogram.

By adjusting the weights $W_i$ based on anticipated spatial characteristics of the image, the weighted-similarity function may be used to emphasize the color characteristics of images being compared based on anticipated spatial characteristics of the images being compared.

Additionally, to detect gradual transitions between consecutive images, conventional similarity functions may be modified to compare the histogram of the current image frame ($f_{j+1}$) with a weighted-average histogram of several previous image frames ($f_1, \ldots, f_j$), which weighted-average histogram may be defined as follows:

$$H_{average}(f_1, f_2, \ldots, f_j) = H(f_j)/2 + H(f_{j-1})/4 +$$
$$H(f_{j-2})/8 + \ldots + H(f_1)/2^j = h_{average}(s_1^1, s_2^1, \ldots, s_j^1),$$
$$h_{average}(s_1^2, s_2^2, \ldots, s_j^2), \ldots, h_{average}(s_1^k, s_2^k, \ldots, s_j^k),$$

where, $h_{average}(s_1^i, s_2^i, \ldots, s_j^i) = h(s_j^i)/2 + h(s_{j-1}^i)/4 + h(s_{j-2}^i)/8 + \ldots + h(s_1^i)/2^j$.

The similarity function is modified based on this weighted-average histogram as follows:

Similarity $$(H(f_{j+1}), H_{average}) = \frac{1}{m \times n} \sum_{i=1}^{k} W_i I^i_{j,j+1}.$$

In each of the above algorithms, the weight $W_i$ is application dependent. For example, to perform home video shot boundary detection, the center segments shown by FIG. 6 are likely to have a higher weight associated therewith to emphasize the objects of interest which generally appear in the center of a home video. In other applications, it may be appropriate to identify one or more segments in positions other than the center, and/or to adjust the weights associated with one or more segments in positions other than the center.

Image segmentation and spatial information were not conventionally used for video processing applications involving movement of objects within consecutive images since the movement of objects from one segment to another within images of a single shot, tends to cause false positives in shot detection. However, because object movements appear slight frame-to-frame when video processing applications involve consecutive video images having a high degree of correlation, the inventors discovered that the video segmenting process performed by this invention will not negatively impact similarity detection, particularly if the number redundancy of the video is used to regulate the number of segments per image. Therefore, the present invention is readily adapted to image comparison in video processing applications.

Figure 9:
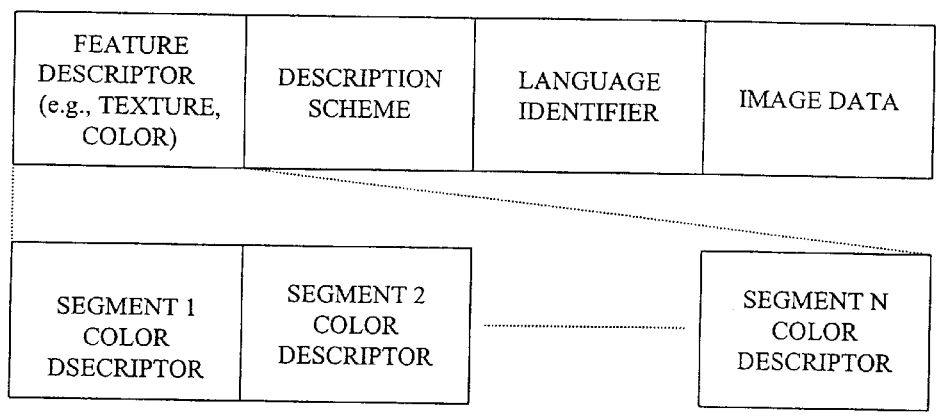
FIG. 9 illustrates an example of a data structure that includes fields specifying color descriptors for segments within an image.

The concepts of this invention may also be easily applied in conjunction with standards that include feature descriptors for color that represent segments of each image. For example, new MPEG (Motion Pictures Expert Group) guidelines are being proposed in which all data must be accompanied by a description which includes at least three fields: (1) a feature descriptor, (2) a description scheme, and (3) a language identifier. The feature descriptor field will be required to include the specification of image features such as color, texture and shape. Under the proposed guidelines, the color descriptor will include histogram information which can be processed as described in the present invention to make a similarity determination. If this feature descriptor is defined to include descriptors for segments of image data that are identified based on anticipated spatial features of the image(s), then the above described systems and processes may be used to determine similarity or otherwise compare the images under this standard. Therefore, as shown for example in FIG. 9, the present invention also contemplates a data structure that includes fields specifying color descriptors for segments within an image, and standards adopting such a data structure.

Data formatted according to such a data structure will include image data as well as the corresponding descriptor fields described above. It can be stored in memory or a storage medium such as a hard disk drive (e.g., see the image data storage device discussed hereinafter with respect to FIG. 10).

Figure 10:
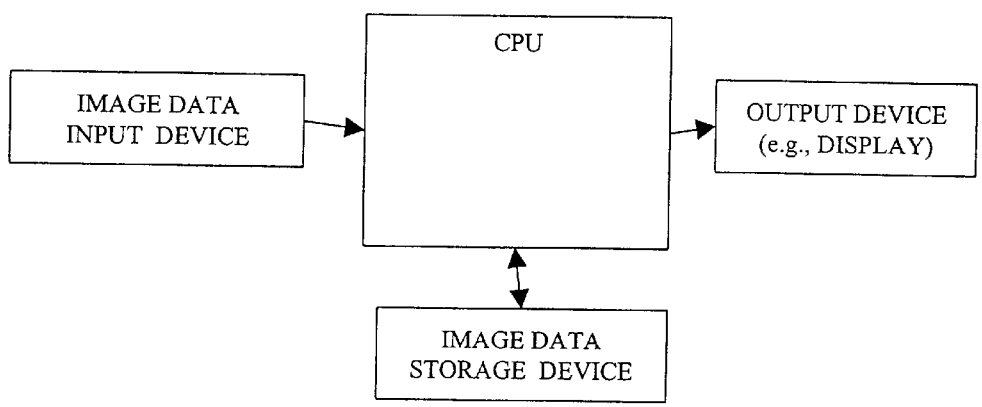
FIG. 10 illustrates an example of a general purpose computer used for implementing the processes performed by the present invention.

As shown in FIG. 10, the above processes may be performed by a general purpose computer having a central processing unit (CPU), an image data input, an image storage-device, and an output device. One of ordinary skill would appreciate that various computer systems are capable of implementing these processes. In addition, the programming required to implement these processes are well within the expertise of those of ordinary skill.

In this disclosure, the terms image and image frame are used o describe, among other things, still images and frames within video images. Furthermore, the color characteristics used by the present invention may relate any one of several color spaces, including the red-green-blue (RGB) color space.

While there have been illustrated and described what are at present considered to be preferred embodiments of the present invention, it will be understood by those skilled in the art that various changes and modifications may be made, and equivalents may be substituted for elements thereof without departing from the true scope of the present invention. In addition, many modifications may be made to adapt a particular situation or material to the teaching of the present invention without departing from the central scope thereof. Therefore, it is intended that the present invention not be limited to the particular embodiment disclosed as the best mode contemplated for carrying out the present invention, but that the present invention includes all embodiments falling within the scope of the appended claims.

The foregoing description and the drawings are regarded by the applicant as including a variety of individually inventive concepts, some of which may lie partially or wholly outside the scope of some or all of the following claims. The fact that the applicant has chosen at the time of filing of the present application to restrict the claimed scope of protection in accordance with the following claims is not to be taken as a disclaimer or alternative inventive concepts that are included in the contents of the application and could be defined by claims differing in scope from the following claims, which different claims may be adopted subsequently during prosecution, for example, for the purposes of a continuation or divisional application.

What I claim is:

1. A method for determining similarity among more than one image, comprising:
   automatically identifying segments within an image by recursively identifying segments within the image using a number of iterations of the recursive identification of segments based on a variance detected among color characteristics of image data within segments previously identified, and the identified segments having attributes that are based on anticipated spatial characteristics of the image; and
   comparing color characteristics of image data within the identified segments of the image to color characteristics of image data within corresponding segments of at least one other image to determine similarity among the images.

2. The method recited by claim 1, wherein the anticipated spatial characteristics of the image include differences in image characteristics that are anticipated at relative positions within the image.

3. The method recited by claim 1, wherein the anticipated spatial characteristics of the image include at least one of an anticipated position of an object within the image and an anticipated difference in coloration between two positions of the image.

4. The method recited by claim 1, wherein the attributes of identified segments include at least one of number, position and size of segments.

5. The method recited by claim 4, wherein the size of segments is nonuniform so as to apply unequal emphasis on features within the image being characterized.

6. The method recited by claim 1, wherein the color characteristics are compared to determine an occurrence of change in image characteristics.

7. The method recited by claim 1, wherein the color characteristics are compared to identify similar images.

8. A method for determining similarity among more than one image, comprising:
   identifying segments within an image with recursive identification of segments using a number of iterations based on a variance detected among color characteristics of image data within segments previously identified;
   computing color characteristics of image data within each of several identified segments of an image;
   comparing the color characteristics of image data within the identified segments of the image to color characteristics of image data within corresponding segments of at least one other image;
   biasing to achieve a greater emphasis for comparisons of color characteristics between selected segments within the images; and
   determining a similarity among the images based on the results of the comparison which reflect the bias.

9. The method recited by claim 8, wherein the biasing involves applying weights to the color characteristics associated with each of the identified segments based on anticipated spatial characteristics of the images.

10. The method recited by claim 9, wherein the comparing involves:
    comparing the weighted color characteristics of image data within the identified segments of the image to the weighted color characteristics of image data within corresponding segments of at least one other image; and
    applying a greater emphasis; to comparisons of segments whose color characteristics are weighted more heavily when determining the similarity among images.

11. The method recited by claim 9, wherein the anticipated spatial characteristics of the image include differences in image characteristics that are anticipated at relative positions within the image.

12. The method recited by claim 9, wherein the anticipated spatial characteristics of the image include at least one of an anticipated position of an object within the image and an anticipated difference in coloration between two positions of the image.

13. The method recited by clam 8, further comprising:
    determining a number, position and size of segments to be identified within the image based on spatial characteristics of the image.

14. The method recited by claim 8, wherein weighted color characteristics are compared to determine an occurrence of change in image characteristics.

15. The method recited by claim 8, wherein weighted color characteristics are compared to identify similar images.

16. A method for determining similarity among more than one image, comprising:
    automatically identifying segments within an image by recursively identifying segments within the image using a number of iterations of the recursive identification of segments based on a variance detected among color characteristics of image data within segments previously identified, and at least one of the identified segments overlapping other of the identified segments; and comparing color characteristics of image data within the identified segments to color characteristics of image data within corresponding segments of at least one other image to determine similarity among the images.

17. The method recited by claim 16, wherein the overlapping segment is completely overlapping other identified segments.

18. The method recited by claim 16, further comprising:

determining attributes of segments identified within the image based on spatial characteristics of the image.

19. The method recited by claim 16, wherein the segments identified within the image include attributes of at least one of number, position and size.

20. The method recited by claim 19, wherein the size of segments is nonuniform so as to apply unequal; emphasis on features within the image being characterized.

21. The method recited by claim 19, wherein the images have anticipated spatial characteristics including differences in image characteristics that are anticipated at relative positions within the image.

22. The method recited by claim 19, wherein the images have anticipated spatial characteristics including at least one of an anticipated position of an object within the image and an anticipated difference in coloration between two positions of the image.

23. The method recited by claim 16, wherein the color characteristics are compared to determine an occurrence of change in image characteristics.

24. The method recited by claim 16, wherein the color characteristics are compared to identify similar images.

25. A data structure comprising:

an image data field corresponding to data representing an image; and a color feature descriptor field that includes multiple units representing color characteristics of corresponding segments identified within the images, wherein the segments are automatically identified with recursive identification of segments using a number of iterations based on a variance detected among color characteristics of image data within segments previously identified.

26. The data structure of claim 25, wherein the segments identified within the image are based on anticipated spatial characteristics of the image so that the units of the color feature descriptor field are based on the anticipated spatial characteristics of the image.

* * * * *